United States Patent [19]

Kingsley

[11] 4,380,389
[45] Apr. 19, 1983

[54] DOCUMENT TRANSPORT FOR RASTER SCANNERS

[75] Inventor: William Kingsley, Rochester, N.Y.

[73] Assignee: Xerox Corporation, Stamford, Calif.

[21] Appl. No.: 286,726

[22] Filed: Jul. 27, 1981

[51] Int. Cl.³ .................. G03B 27/48; G03B 27/50
[52] U.S. Cl. ........................................ 355/50
[58] Field of Search .................. 355/50, 51; 352/221, 352/227

[56] References Cited

U.S. PATENT DOCUMENTS

| Re. 29,187 | 4/1977 | Knechtel et al. | 355/51 |
|---|---|---|---|
| 1,727,900 | 9/1929 | Patterson | 352/227 |
| 2,172,256 | 9/1939 | Nagel | 352/221 |
| 2,246,970 | 6/1941 | Brenkert | 352/227 |
| 2,930,284 | 3/1960 | Limberger | 355/51 |
| 3,029,687 | 4/1962 | Veit | 352/221 |
| 3,424,529 | 1/1969 | Tiger et al. | 355/51 |
| 3,497,296 | 2/1970 | Faw . | |
| 3,545,856 | 12/1970 | Limberger | 355/51 |
| 3,575,503 | 4/1971 | Van Auren et al. . | |
| 3,790,272 | 2/1974 | Knechtel et al. | 355/51 |
| 3,825,338 | 7/1974 | Kolibas | 355/50 |
| 3,989,368 | 11/1976 | Sohm | 355/51 |
| 4,005,257 | 1/1977 | Krallinger et al. . | |
| 4,017,172 | 4/1977 | Lynch | 355/51 |
| 4,076,403 | 2/1978 | Nishikawa et al. . | |

OTHER PUBLICATIONS

Xerox Disclosure Journal vol. 4, No. 6, Nov./Dec. 1979 Copy Furnished by Applicant.

Primary Examiner—Monroe H. Hayes
Attorney, Agent, or Firm—Frederick McMullen

[57] ABSTRACT

A constant velocity transport for moving documents of various thicknesses at a uniform rate across the scan aperture of a raster input scanner employing one or more solid state arrays for scanning the document through the aperture line by line. A floating viewing element is disposed in the scan aperture with the document transport comprising a single feed roll disposed opposite the viewing element and in engagement therewith. The viewing element and the feed roll cooperate to form a nip between which the document being scanned passes. A pair of leaf springs bias the viewing element into operative engagement with the feed roll while permitting various thickness documents to be fed. A controlled friction surface is provided on the viewing element at the point where contact between the feed roll and viewing element is established to obviate velocity perturbations in the feed roll resulting from changeover from a no document feed to a document feed state and vice versa.

3 Claims, 1 Drawing Figure

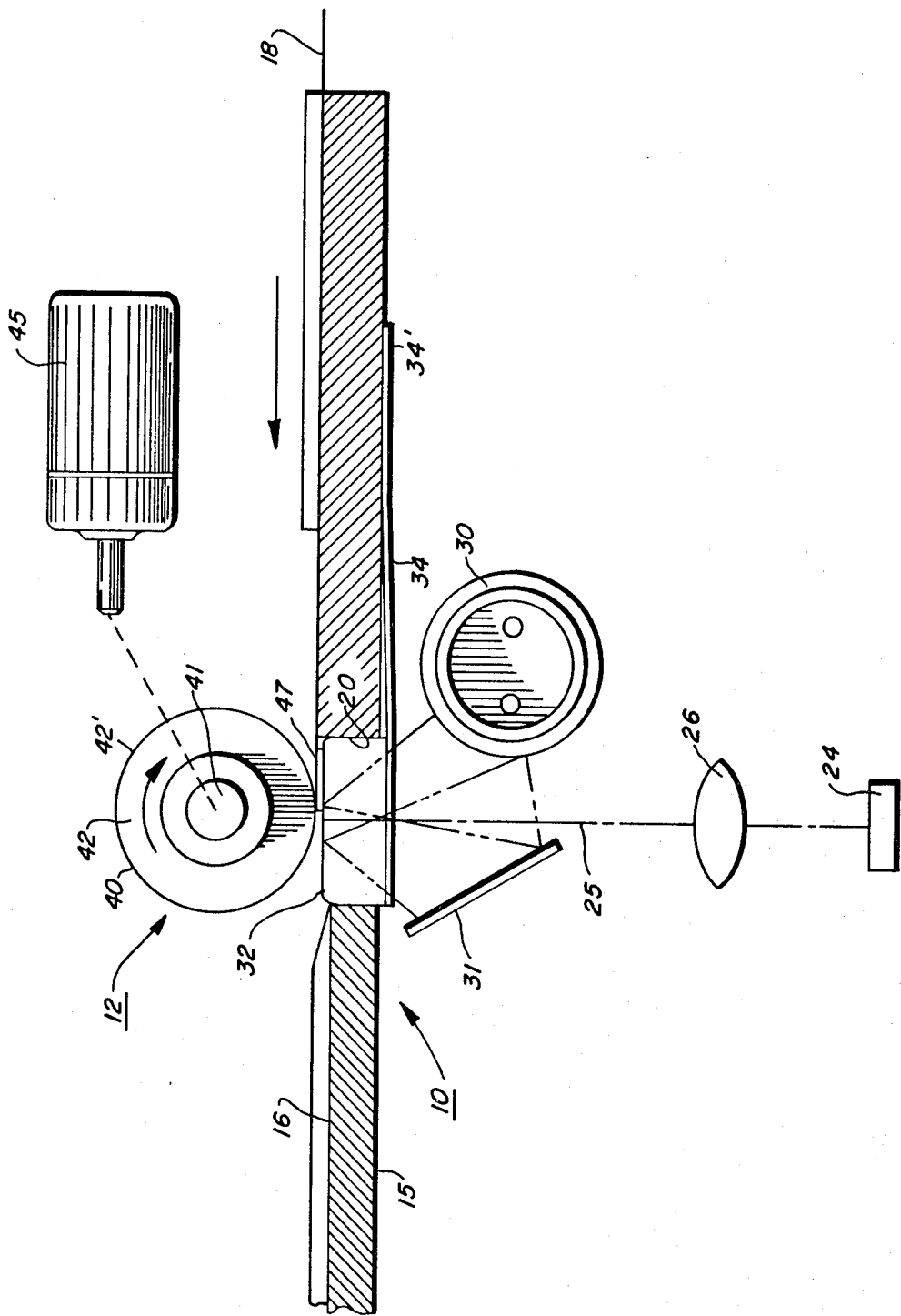

DOCUMENT TRANSPORT FOR RASTER SCANNERS

This invention relates to a raster scanner for scanning documents, and more particularly to an improved constant velocity transport for imparting scanning motion to the document being scanned.

Raster input scanners employ one or more scanning elements such as solid state arrays to scan the image areas of a document original, the scanning elements with associated circuitry converting the image areas viewed into video image signals. The scanning elements normally scan the document in line by line fashion with the scan element or elements relied upon to scan across the document in a direction substantially perpendicular to the direction of document movement. To provide scanning movement in the opposite direction, relative movement between the scanning element and the document is introduced, typically by physically moving the document across the scanning or viewing aperture. For this purpose, a document transport is used.

However, to assure undistorted scanning, it is necessary that the document be moved at a uniform rate. If the document is moved too slow, redundant scanning can occur; if movement is too fast, image areas may be missed. But further, it is also necessary that the document velocity be constant throughout the length of the document, that is, from the document leading edge to the document trailing edge. Inasmuch as a mechanical device such as a feed belt, feed roll etc. must be relied upon to move the document, velocity perturbations inherent in the feeder itself can occur which may result in varying document feeding rates with consequent distortion in the scanned image output.

Additionally, conventional document feeders often have little tolerance for varying document thicknesses, the feeder normally being designed and/or set up to feed documents within a small range of thicknesses reliably and at a preset speed. When the thickness of the document is substantially different, driving contact between the document feeding mechanism and the document may be upset to such a degree that the document velocity is changed.

This invention relates to a raster input scanner having at least one array for scanning documents line by line, and comprises the combination of; means forming a surface for supporting the document to be scanned; a slit-like scanning aperture in the surface forming means through which the array scans the document, the longitudinal axis of the aperture being substantially parallel to the direction of scan of the array; transport means for moving a document to be scanned along the surface forming means and across the scanning aperture in a direction substantially perpendicular to the direction of scan of the array; means forming a transparent viewing window in the scanning aperture; the transport means including a document feed roll, the periphery of the feed roll cooperating with the viewing window to form a nip through which a document to be scanned passes; bias means for releasably biasing the viewing window and the document feed roll periphery into contact with one another; and drive means for rotating the document feed roll to transport the document to be scanned along the surface forming means and across the viewing window for scanning by the array, tangential contact of the document feed roll with the viewing window imparting constant velocity to the document while the bias means permits the nip to expand to accommodate passage of the document therethrough while minimizing velocity variations of the document as the document enters and leaves the nip.

In the drawings, the FIGURE is a schematic view of a raster scanner incorporating the constant velocity transport of the present invention.

Referring to the drawing, there is a shown a raster input scanner 10 incorporating the constant velocity transport 12 of the present invention. Raster scanner 10 includes a surface forming means in the form of a document support member 15 having a relatively flat surface 16 across which documents 18 to be scanned are moved in the direction shown by the solid line arrow. A slit-like scanning aperture 20 is provided in the support member 15, the longitudinal axis of aperture 20 extending in the direction substantially perpendicular to the direction of movement of the document 18.

A suitable array 24 such as a Fairchild Corporation Model 121-H linear array is provided for scanning the document image line by line as the document passes across aperture 20. Array 24 is disposed so that the scanning axis thereof is substantially parallel to the axis of scanning aperture 20. The optical path between scanning aperture 20 and array 24 (designated by the numeral 25) includes a lens 26 for focusing the document images viewed by array 24 through aperture 20 onto the array 24. A lamp 30, disposed below the support member 15 and to one side of the optical path 25, illuminates the aperture area in the document image area thereover. To enhance illumination, a reflector 31 is disposed on the other side of the optical path 25 across from lamp 30, reflector 31 serving to reflect light emitted by lamp 30 into the aperture area.

A combination support-viewing element 32 which is formed from any suitable transparent material such as glass is movably disposed within the scanning aperture 20. Viewing element 32 is mounted on a pair of leaf springs 34. Springs 34, the longitudinal axis of which extends in a direction substantially parallel to the direction of movement of the document to be scanned to reduce perturbations in the document feed, have the remote ends 34' thereof secured as by cementing to the underside of support member 15. As will be understood, leaf springs 34 bias viewing element 32 upwardly and into the confines of scanning aperture 20.

Document transport 12 includes a document feed roll 40 rotatably mounted on support member 15 above scanning aperture 20 and the viewing element 32 therein, such that the periphery 42' of the roll 40 contacts the upper surface of viewing element 32 at a point just upstream of the optical path 25. As will appear, feed roll 40 serves to move the document to be scanned along support member 15 and across the viewing element 32. Feed roll 40 comprises an internal core member or shaft 41, normally metal, having a rubber sleeve 42 thereabout. Sleeve 42 is perferably formed from a relatively hard durometer rubber material to assure uniform friction and provide long life. The remote ends of shaft 41 of roll 40 are rotatably journaled by suitable bearings (not shown) mounted on support member 15. A motor 45 is coupled to shaft 41 by suitable means (not shown), motor 45 rotating feed roll 40 in the direction shown by the solid line arrow upon energization of motor 45.

As will be understood, springs 34 hold viewing element 32 in resilient contact with the periphery of feed roll 40, roll 40 and viewing element 32 cooperating to form a nip between which the document 18 to be scanned passes. The bias provided by springs 34 permits transport 12 to accommodate documents of varying thickness without velocity changes.

To assure substantially uniform frictional loading on feed roll 40 and reduce any tendency of feed roll 40 to change velocity with changes in frictional loading, as when passing from a no document feed state where feed roll 40 contacts the surface of viewing element 32 to a document feed state where the feed roll 40 contacts a document, a low friction surface 47 is provided on viewing element 32. The low frictional surface 47 which may for example comprise a piece of Teflon tape, is disposed on viewing element 32 at a point where the periphery of feed roll 40 contacts viewing element 32 and upstream of the optical axis 25.

In operation, exposure lamp 30 and drive motor 45 are energized, the latter serving to rotate feed roll 40 in the direction shown by the solid line arrow. At the same time, array 24 is actuated. The leading edge of the document to be scanned is fed forward by suitable means (not shown) into the nip formed by viewing element 32 and feed roll 40, springs 34 permitting the requisite separation between feed roll 40 and viewing window 32 to accommodate the document therebetween without upsetting or changing document velocity. Feed roll 40 carries the document forward along the surface of support member 15 and across viewing element 32, array 24 scanning the document line by line as the document passes thereover. Contact between feed roll 40 and low frictional surface 47 before the leading edge of the document 18 to be scanned reaches the nip formed by roll 40 and surface 47 and after the trailing edge of the document passes beyond the nip obviates any tendency for the velocity of feed roll 40 to change due to the presence or absence of a document in the nip.

While the invention has been described with reference to the structure disclosed, it is not confined to the details set forth, but is intended to cover such modifications, or changes as may come within the scope of the following claims.

I claim:

1. In a raster input scanner having at least one array for scanning documents line by line, the combination of:
    (a) means forming a surface for supporting a document to be scanned, said surface forming means having a slit-like scanning aperture therein through which said array scans said document, the longitudinal axis of said aperture being substantially parallel to the direction of scan by said array;
    (b) transport means for moving a document to be scanned along said surface forming means and across said scanning aperture in a direction substantially perpendicular to the direction of scan by said array;
    (c) means forming a transparent viewing window in said scanning aperture;
    (d) said transport means including a document feed roll, the periphery of said feed roll cooperating with said viewing window to form a nip through which a document to be scanned passes;
    (e) bias means for releasably biasing said viewing window and said document feed roll periphery into contact; and
    (f) drive means for rotating said document feed roll to transport the document to be scanned along said surface forming means and across said viewing window for scanning by said array, tangential contact of said document feed roll with said viewing window imparting constant velocity to said document while said bias means permits said nip to expand to accommodate passage of said document therethrough while minimizing velocity variations of said document as said document enters and leaves said nip.

2. The scanner according to claim 1 in which said bias means comprises at least one leaf spring, said spring supporting said viewing window in said scanning aperture, the longitudinal axis of said leaf spring being substantially parallel to the direction in which a document to be scanned is moved by said transport means whereby to minimize variations in velocity of said document as said document is moved across said viewing window.

3. The scanner according to either claim 1 or 2 including
    means forming a friction reducing surface on said viewing window opposite the point where said feed roll periphery contacts said viewing window for substantially equating friction forces on said feed roll when no document is being fed with friction forces when a document is being fed whereby to reduce friction induced changes in velocity of said feed roll.

* * * * *